US008176681B2

(12) United States Patent
Tamaoki et al.

(10) Patent No.: US 8,176,681 B2
(45) Date of Patent: May 15, 2012

(54) ROOF SIDE WEATHER STRIP FOR AUTOMOBILE

(75) Inventors: Kiyotaka Tamaoki, Aichi-ken (JP);
Hidenori Kameoka, Atsugi (JP);
Hiroshi Nagaishi, Chigasaki (JP)

(73) Assignees: Toyoda Gosei Co., Ltd.,
Nishikasugai-gun, Aichi-ken (JP);
Nissan Motor Co., Ltd., Yokohama-shi,
Kanagawa (JP)

( * ) Notice: Subject to any disclaimer, the term of this patent is extended or adjusted under 35 U.S.C. 154(b) by 952 days.

(21) Appl. No.: 12/213,960

(22) Filed: Jun. 26, 2008

(65) Prior Publication Data
US 2009/0001754 A1  Jan. 1, 2009

(30) Foreign Application Priority Data

Jun. 28, 2007  (JP) ................ P2007-170222

(51) Int. Cl.
*B60J 10/08* (2006.01)
(52) U.S. Cl. ..................... 49/498.1; 49/475.1
(58) Field of Classification Search ............. 49/475.1, 49/476.1, 489.1, 490.1, 493.1, 495.1, 498.1; 296/146.9
See application file for complete search history.

(56) References Cited

U.S. PATENT DOCUMENTS

| | | | | |
|---|---|---|---|---|
| 3,938,856 A | * | 2/1976 | Janssen | 296/154 |
| 4,827,670 A | * | 5/1989 | Kogiso et al. | 49/476.1 |
| 4,919,471 A | * | 4/1990 | Seino et al. | 296/154 |
| 5,050,349 A | * | 9/1991 | Goto et al. | 49/489.1 |
| 5,105,580 A | * | 4/1992 | Akachi et al. | 49/476.1 |
| 5,209,019 A | * | 5/1993 | Morita | 49/490.1 |
| 5,311,702 A | * | 5/1994 | Moore | 49/495.1 |
| 5,331,767 A | | 7/1994 | Takeuchi et al. | |
| 5,356,194 A | * | 10/1994 | Takeuchi | 296/146.9 |
| 5,369,914 A | * | 12/1994 | Takeuchi | 49/495.1 |

(Continued)

FOREIGN PATENT DOCUMENTS
DE  20 2007 003 836  6/2007
(Continued)

OTHER PUBLICATIONS

European Search Report daged May 26, 2010.
(Continued)

*Primary Examiner* — Blair M Johnson
*Assistant Examiner* — Justin Rephann
(74) *Attorney, Agent, or Firm* — McGinn IP Law Group, PLLC (57) ABSTRACT

A roof side weather strip has an upper side portion, a vertical side portion and a corner portion. The vertical side portion has a mounting base portion which is to be mounted on a pillar, a hollow seal portion which is formed on a vehicle-interior inner surface of the mounting base portion and is adapted to be brought into abutment with a door glass, and a seal lip portion which is formed on a vehicle-exterior inner surface of the mounting base portion adjacent to a vehicle-interior side of the hollow seal portion and is adapted to be brought into abutment with a vehicle-interior side surface of the door glass. A groove portion is formed between the hollow seal portion and the seal lip portion, and a water stopping rib is formed in a portion in the groove portion which constitutes a portion on the corner portion which lies in the vicinity of the vertical portion or a portion on the vertical side portion which lies in the vicinity of the corner portion.

6 Claims, 4 Drawing Sheets

U.S. PATENT DOCUMENTS

| | | | | |
|---|---|---|---|---|
| 5,527,583 | A * | 6/1996 | Nozaki et al. | 428/99 |
| 5,791,722 | A * | 8/1998 | Nozaki et al. | 296/146.9 |
| 5,806,914 | A | 9/1998 | Okada | |
| 5,974,739 | A * | 11/1999 | Corney | 49/493.1 |
| 6,010,177 | A * | 1/2000 | Fujita et al. | 296/107.04 |
| 6,644,718 | B2 | 11/2003 | Nozaki | |
| 6,938,378 | B2 * | 9/2005 | Nozaki et al. | 49/498.1 |
| 7,070,224 | B2 * | 7/2006 | Tsuchida | 296/135 |
| 7,172,239 | B2 * | 2/2007 | Nozaki et al. | 296/146.9 |
| 7,197,850 | B2 * | 4/2007 | Mizutani et al. | 49/498.1 |
| 7,350,849 | B2 * | 4/2008 | Roush et al. | 296/146.9 |

FOREIGN PATENT DOCUMENTS

| | | |
|---|---|---|
| EP | 0 739 770 | 10/1996 |
| JP | 55-174018 U | 12/1980 |
| JP | 61-57061 U | 4/1986 |
| JP | 5-28727 U | 4/1993 |
| JP | 5-278473 | 10/1993 |
| JP | 5-86644 | 11/1993 |
| JP | 6-127315 | 5/1994 |
| JP | 9-323545 | 12/1997 |
| JP | 10-053026 A | 2/1998 |
| JP | 2000-203273 A | 7/2000 |
| JP | 2002-205607 A | 7/2002 |
| JP | 2002-274190 A | 9/2002 |
| JP | 2003-54329 | 2/2003 |
| JP | 2004-268890 | 9/2004 |

OTHER PUBLICATIONS

Japanese Office Action dated Jul. 19, 2011 (with an English translation).

* cited by examiner

ROOF SIDE WEATHER STRIP FOR AUTOMOBILE

BACKGROUND OF THE INVENTION

1. Field of the Invention

The present invention relates to a roof side weather strip for an automobile for providing a seal between an upper portion of an edge of a door opening in a vehicle body of an automobile and a door glass of a door.

2. Related Art

Conventionally, in a seal construction for providing a seal between an edge of a door opening in a vehicle body of an automobile for a door with a door sash, for example, an opening weather strip is mounted on a flange at the edge of the door opening in the vehicle body and a door weather strip is mounted on an outer circumference of the door sash, whereby when the door is closed, a hollow seal portion of the door weather strip is brought into abutment with a swollen portion of the door sash so as to bring the hollow seal portion and a seal lip of the door weather strip into abutment with an outer panel at the edge of the door opening in the vehicle body to thereby provide a seal between the vehicle body and the door.

As this occurs, a door glass which ascends and descends in an interior of the door is held along its circumference by a glass run which is mounted on an inner circumferential side of the door sash and ascends and descends in a groove portion of the glass run, and a seal between the door glass and the door sash is provided by the glass run.

In this case, however, when looking at a side of the automobile from the outside, the glass run, the door sash and the center pillar become visible around the circumference of the door glass, and hence, there has been room for improvement from the point of view of design. In addition, since the glass run is present between the door sash or the center pillar and the door glass, there exists a gap in surface level between the door sash and the door glass, which has been not preferable from the point of view of design.

Figure 4:
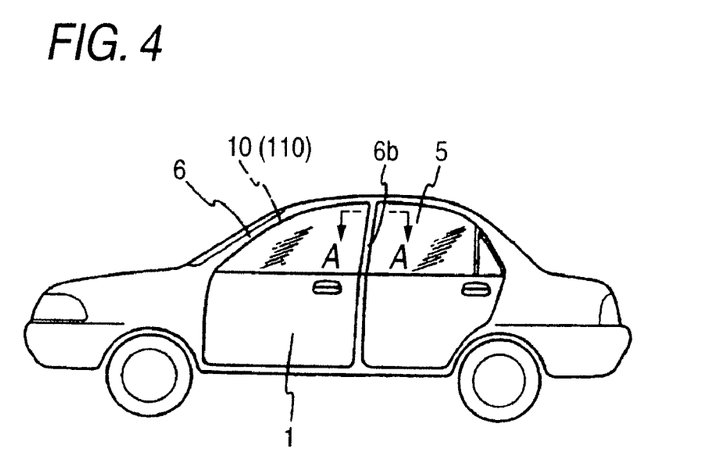
FIG. 4 is a side view of an automobile.

To cope with this, as is shown in FIG. 4, an automobile body of a type which incorporates sashless doors is now adopted in which a door sash is eliminated and only a door glass 5 is made to freely ascend and descend in a portion upper than a belt line of a door 1. By this configuration, when looking at the side of the automobile from the outside, only the door glass 5 becomes visible from the outside in the upper portion than the belt line location of the door 1.

In this case, a seal between an upper portion of an edge of a door opening in the vehicle body and the door glass 5 is attained, as is shown in FIG. 4, by the door glass 5 being brought into abutment with a roof side weather strip 110 mounted on an upper portion of a peripheral part 6 of the vehicle body opening. A retainer 4, which is formed integrally with a roof molding 2 functioning as a molding portion, is mounted on the peripheral part 6 of the vehicle body opening.

Figure 5:
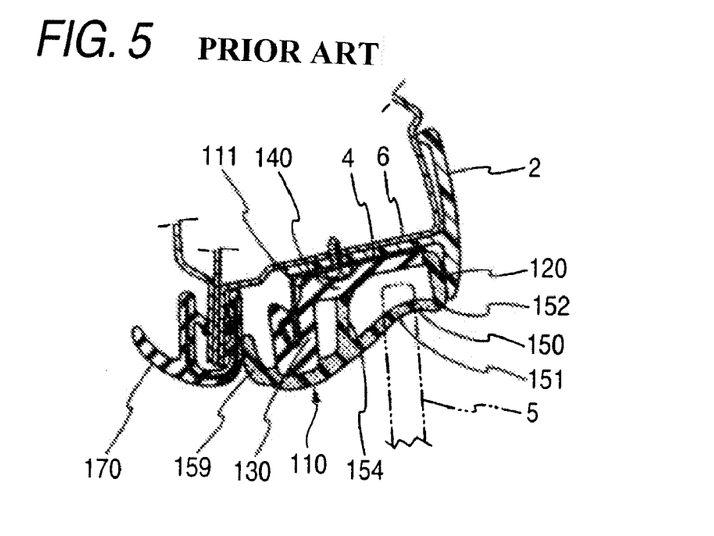
FIG. 5 is a sectional view of an upper side portion of a conventional roof side weather strip.

As is shown in FIG. 5, an upper side portion of the roof side weather strip 110 which lies close to the roof is made up of a mounting base portion 111 which is mounted on the retainer 4 on the peripheral part 6 of the vehicle body opening and a seal portion 150 which is brought into abutment with an upper end of the door glass 5 to provider a seal thereat. The mounting base portion 111 is made up of a vehicle-exterior side wall 120, a vehicle-interior side wall 130 and a bottom wall 140.

The seal portion 150 is formed of a seal wall 151 which is brought into abutment with the upper end of the door glass 5 and a hollow portion 152, and when the door glass 5 is brought into abutment therewith, the seal wall 151 deflects into an interior of the hollow portion 152 and encompasses the upper end of the door glass to provide a seal thereat (for example, refer to JP-A-2003-54329). In addition, a trim 170 is mounted on a flange of the peripheral part 6 of the vehicle body opening so that a cover lip 159 which is provided to extend from the roof side weather strip 110 is brought into abutment with the trim 170 to cover a gap.

In this case, however, being different from the case with the sashed door, the door glass 5 is not held along a peripheral part of an upper portion and side portions thereof by the door sash and the glass run, and hence, the door glass 5 becomes easy not only to be deflected at an upper end position thereof but also to be deflected towards the outside of the vehicle. Because of this, there has occurred a case where the position changes where the door glass 5 is brought into abutment with the seal portion 150 while the door is closed, whereby the seal portion 150 is deformed abnormally to deteriorate the sealing performance.

In addition, in the case of the sashless door, when the door 1 is closed with the door glass 5 kept in a raised position, the door glass 5 is brought into abutment with the roof side weather strip 110 from the side or a lateral direction, and when the door glass 5 is raised or lowered while the door 1 is closed, the door glass 5 is brought into abutment with the roof side weather strip 110 fro below. Because of this, there has been a limitation on the extent to which the sealing performance is satisfied equally when the door glass 5 is brought into abutment with the roof side weather strip 110 from the respective directions.

Figure 6:
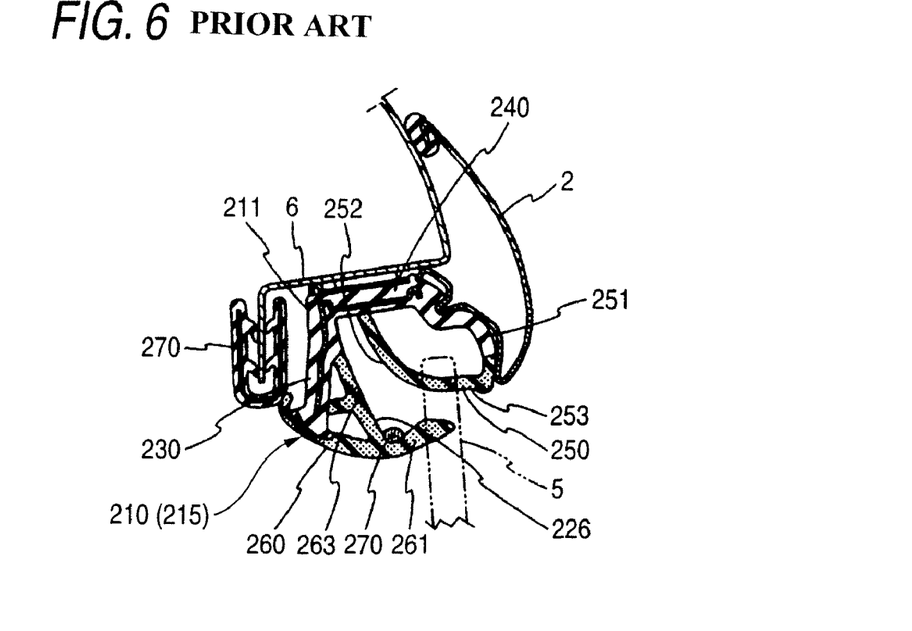
FIG. 6 is a sectional view of an upper side portion of the other conventional roof side weather strip.

To deal with this, as is shown in FIG. 6, there exists a configuration in which a hollow seal portion is divided into two so as to provide a seal in two locations such as an upper end of a door glass 5 and a vehicle-interior side surface of an upper end portion thereof, so that seals are provided relative to the respective abutment directions of the door glass 5 by the divided seal portions (for example, refer to JP-UM-A-5-86644).

In FIG. 6, a roof side weather strip 210 of an upper side portion 215 is made up of a mounting base portion 211 mounted on a peripheral part 6 of a vehicle body opening, and a first seal portion 250 and a second seal portion 260 which are two seal portions which are formed integrally with the mounting base portion 211 and separately from each other.

The mounting base portion 211 is made up of a vehicle-interior side wall 230 and a bottom wall 240.

The first seal portion 250 is formed on a vehicle-exterior side of the bottom wall 240 and is formed into a hollow shape by a first seal vehicle-exterior side wall 251 and a first seal vehicle-interior side wall 252 and a first seal abutment wall 253 which are provided so as to extend from upper ends of those side walls so as to be brought into abutment with a distal end of the door glass 5 to provide a seal thereat.

The second seal portion 260 is formed into a lip shape or a hollow shape and is brought into abutment with a vehicle-interior side surface of the door glass 5 when the door glass 5 ascends, whereby a distal end portion 261 is bent to form a groove portion 226.

Figure 7:
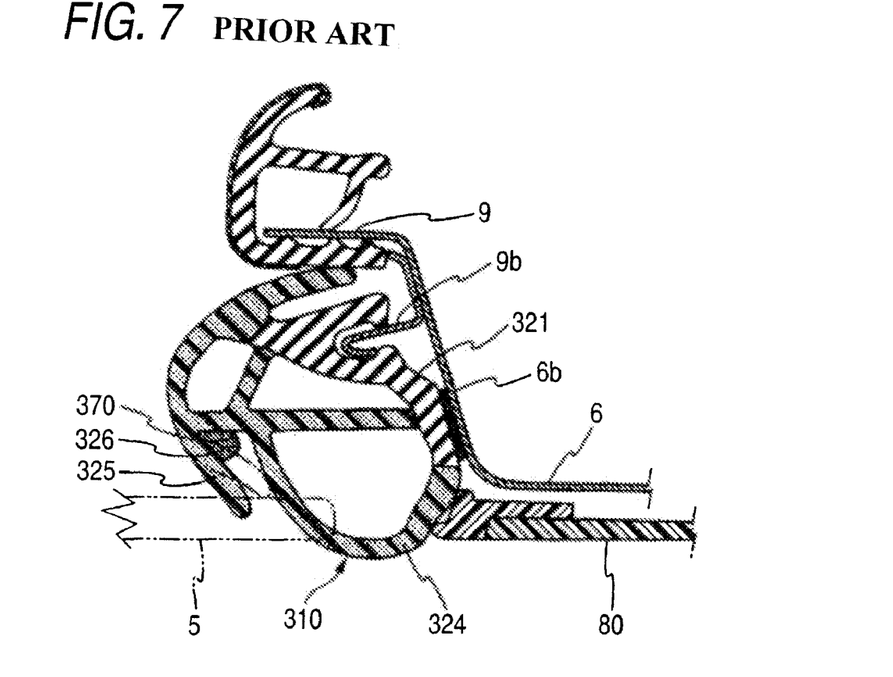
FIG. 7 is a sectional view of a vertical side portion of the other conventional roof side weather strip.

In addition, a roof side weather strip 310 of a vertical side portion that is mounted on a center pillar has, as is shown in FIG. 7, a mounting base portion 321 which is to be mounted on a vertical side portion retainer 9b provided on the center pillar 6b of the peripheral part 6 of the vehicle body opening, a hollow seal portion 324 formed on a vehicle-exterior side of the mounting base portion 321 and a seal lip portion 325 formed on a vehicle-interior side of the mounting base portion 321. A groove portion 326 is formed between the hollow seal portion 324 and the seal lip portion 325.

This groove portion 326 keeps forming a space even when the door is closed or the door glass 5 is raised whereby the seal lip portion 325 is brought into abutment with the inner surface of the door glass 5 and continues to the groove portion 226 in the upper side portion by way of a similar groove portion in a corner portion.

In addition, also when the door is closed, as is shown in FIG. 7, an end portion of the door glass 5 is not held by a glass run in any case but only abuts with the hollow seal portion and the seal lip portion 325, and the hollow seal portion 324 is slightly exposed towards the outside of the vehicle between the distal end of the door glass 5 and a distal end of a garnish 80.

Because of this, when water under high pressure is applied to the side of the automobile from the outside in an attempt to wash the automobile, the water under high pressure hits directly the hollow seal portion 324, whereby there may be caused a case where the hollow seal portion 324 is depressed to allow the water to enter an interior of the groove portion 326 from between the distal end of the door glass 5 and the hollow seal portion 324 so depressed. There is a configuration in which a drainage groove is formed through which the water 370 that has so entered flows down below the groove portion 326 (for example, refer to JP-A-6-127315 and JP-A-2004-268890.). However, in the vertical side portion which lies close to the corner portion, there may occur a case where the water flows in as far as the groove portion 226 of the upper side portion 215 by way of the groove portion in the corner portion. The water 270 that has so entered stays in the groove portion 226 of the second seal portion 260, whereby there may be caused a case where the water falls into the passenger compartment from the distal end portion 261 of the second seal portion 260 when the door is opened.

SUMMARY OF THE INVENTION

Because of this, in the automobile utilizing the sashless doors, a weather strip has been demanded which prevents the fall of water that has infiltrated between the peripheral part of the vehicle body opening and the door glass into the passenger compartment when the door is opened.

With a view to solving the problem, according to a first aspect of the invention, there is provided a roof side weather strip for an automobile mounted on a peripheral part of a vehicle body opening in a vehicle body of the automobile, which is of a hard-top type, to provide a seal between the peripheral part of the vehicle body opening and a door, the roof side weather strip having an upper side portion mounted along a roof of the vehicle body of the automobile, a vertical side portion mounted along a pillar of the vehicle body of the automobile, and a corner portion mounted at a corner of the peripheral part to connect the upper side portion and the vertical side portion together while gradually changing cross sectional shapes thereof, wherein the vertical side portion has a mounting base portion which is to be mounted on the pillar, a hollow seal portion formed on a vehicle-exterior inner surface of the mounting base portion so as to be brought into abutment with a door glass, and a seal lip portion formed on a vehicle-interior inner surface of the mounting base portion adjacent to an inside of the hollow seal portion so as to be brought into abutment with a vehicle-interior surface of the door glass, wherein a groove portion being formed between the hollow seal portion and the seal lip portion, and wherein a water stopping rib is formed in a portion in the groove portion which is a portion of the corner portion lying adjacent to the vertical side portion or a portion of the vertical side portion lying adjacent to the corner portion.

In the first aspect of the invention, the roof side weather strip has the upper side portion mounted along the roof of the vehicle body of the automobile, the vertical side portion mounted along the pillar of the vehicle body of the automobile, and the corner portion mounted at the corner of the peripheral part to connect the upper side portion and the vertical side portion together while gradually changing the cross sectional shapes thereof. Because of this, the sealing performance of the whole of the roof side weather strip including the corner portion is ensured while connecting together smoothly the vertical side portions and the upper side portions whose cross sectional shapes are different.

The vertical side portion has the mounting base portion which is to be mounted on the pillar, the hollow seal portion formed on the vehicle-exterior inner surface of the mounting base portion so as to be brought into abutment with the door glass, and the seal lip portion formed on the vehicle-interior inner surface of the mounting base portion adjacent to the inside of the hollow seal portion so as to be brought into abutment with the vehicle-interior surface of the door glass. Because of this, the distal end of the door glass is brought into abutment with the hollow seal portion when the door is closed, whereby a double seal can be provided together with the seal lip portion which is brought into abutment with the vehicle-interior side surface of the door glass, thereby making it possible to enhance the sealing performance.

Since the groove portion is formed between the hollow seal portion and the seal lip portion, when the seal lip portion is brought into abutment with the vehicle-interior side surface of the door glass, the seal lip portion can be deflected easily, whereby even when the door glass is deflected towards the outside of the vehicle due to vibrations of the automobile or due to the automobile running at high speeds, the seal lip portion can be held in abutment with the vehicle-interior side surface of the door glass. In addition, even though rain water infiltrates from between the hollow seal portion and the distal end of the door glass, the rain water that has so entered can be discharged to the outside of the vehicle from the groove portion.

Since the water stopping rib is formed in the portion in the groove portion which is the portion of the corner portion lying adjacent to the vertical side portion or the portion of the vertical side portion lying adjacent to the corner portion, when the automobile is washed with water under high pressure, even though washing water filtrates into the groove portion in the vicinity of the corner portion, the water that has so entered can be prevented from entering the upper side portion by the water stopping rib so as to be discharged downwards. Consequently, there is caused no case where rain water falls into the passenger compartment when the door is opened. Since the water stopping rib is formed in the portion which lies close to the corner portion or the vertical side portion, the water stopping rib can be formed at the same time as the corner portion is molded, thus the manufacturing thereof being facilitated.

According to a second aspect of the invention, there is provided a roof side weather strip for an automobile as set forth in the first aspect above, wherein the water stopping rib is formed so as to be inclined relative to a longitudinal direction of the vertical side portion.

In the second aspect of the invention, since the stopping rib is formed so as to be inclined relative to the longitudinal direction of the vertical side portion, when the seal lip portion is brought into abutment with the distal end of the door glass while the door is closed, the water stopping rib can be deflected easily, whereby the seal lip portion is deflected so as to reduce the force with which the door is closed.

According to a third aspect of the invention, there is provided a roof side weather strip for an automobile as set forth in the first or second aspect above, wherein the water stopping rib is formed such that the rib is wide in a portion thereof which is situated at a bottom side of the groove portion and gradually becomes lower in height, extending towards an opening of the groove portion.

In the third aspect of the invention, since the water stopping rib is formed such that the rib is wide in the portion thereof which is situated at the bottom side of the groove portion and gradually becomes narrower in width, extending towards the opening of the groove portion, when the seal lip portion is brought into abutment with the distal end of the door glass while the door is closed, the seal lip portion and the water stopping rib are brought into close contact with each other, so as to seal off the groove portion in an ensured fashion, thereby making it possible to prevent the infiltration of rain water into the upper side portion.

According to a fourth aspect of the invention, there is provided a roof side weather strip for an automobile as set forth in any of the first to third aspects above, wherein the water stopping rib is formed so as to be integral with the hollow seal portion and to be spaced apart from the seal lip portion to define a space therebetween.

In the fourth aspect of the invention, since the water stopping rib is formed so as to be integral with the hollow seal portion and to be spaced apart from the seal lip portion to define the space therebetween, the seal lip portion is made to be easily deflected, whereby the force with which the door is closed can be reduced when the door is closed. In addition, since the water stopping rib is formed integrally with the hollow seal portion, even though it is formed thin, the deformation of the water stopping rib can be prevented, thereby making it possible to ensure the prevention of infiltration of rain water.

According to a fifth aspect of the invention, there is provided a roof side weather strip for an automobile as set forth in any of the first to fourth aspects above, wherein the water stopping rib is made of a sponge material.

In the fifth aspect of the invention, since the water stopping rib is made of the sponge material, when the seal lip portion is brought into abutment with the water stopping rib, the water stopping rib can be deformed in accordance with deflection of the seal lip portion, so as to ensure the closure of the groove portion, thereby making it possible to prevent the infiltration of water that has infiltrated into the groove portion into the upper side portion.

According to a sixth aspect of the invention, there is provided a roof side weather strip for an automobile as set forth in any of the first to fifth aspects above, wherein the mounting base portion of the vertical side portion is mounted on the pillar with a pressure sensitive adhesive double coated tape.

In the sixth aspect of the invention, since the mounting base portion of the vertical side portion is mounted on the pillar with the pressure sensitive adhesive double coated tape, the mounting base portion can be mounted by pressing the pressure sensitive adhesive double coated tape, and the sealing performance between the pillar of the peripheral part of the vehicle body opening and the roof side weather strip. Then, with the retainer eliminated, the mounting base portion can be mounted directly on a sheet metal of the pillar with the pressure sensitive adhesive double coated tape. As this occurs, the reduction in weight of the vehicle body can be enhanced.

According to a seventh aspect of the invention, there is provided a roof side weather strip for an automobile as set forth in any of the first to sixth aspects above, wherein the upper side portion of the roof side weather strip has an upper side portion mounting base portion which is to be mounted on the peripheral part of the vehicle body opening and an upper side portion seal portion which is formed integrally with the upper side portion mounting portion to provide a seal between the peripheral part of the vehicle body opening and the door, the upper side portion mounting portion including at least a bottom wall and a vehicle-interior side wall, and wherein an upper side portion first seal portion which is brought into abutment with a distal end of the door glass to provide a seal thereat and an upper portion second seal portion which is brought into abutment with a vehicle-interior side face of a distal end portion of the door glass to provide a seal thereat are provided separately on an inner surface of the upper side portion mounting portion.

In the seventh aspect of the invention, the roof side weather strip has the upper side portion mounting base portion which is to be mounted on the peripheral part of the vehicle body opening and the upper side portion seal portion which is formed integrally with the upper side portion mounting portion to provide the seal between the peripheral part of the vehicle body opening and the door, and the upper side portion mounting portion includes at least the bottom wall and the vehicle-interior side wall. Because of this, when the upper side portion mounting base portion is mounted on the peripheral part of the vehicle body opening, the position of the upper side portion seal portion is fixed in place, thereby making it possible for the upper side portion seal portion to be brought into abutment with the door glass in an ensured fashion to thereby provide a seal thereat.

The upper side portion first seal portion which is brought into abutment with the distal end of the door glass to provide the seal thereat and the upper portion second seal portion which is brought into abutment with the vehicle-interior side face of the distal end portion of the door glass to provide the seal thereat are provided separately on the inner surface of the upper side portion mounting portion. Because of this, a double seal can be provided at the upper end of the door glass and the vehicle-interior side face of the upper end portion of the door glass, thereby making it possible to enhance the sealing performance. Furthermore, even though the door glass is brought into abutment therewith from the lateral direction when the door is closed, or even though the door glass is brought into abutment therewith from below when the door glass is raised, the deformations of the upper side portion first seal portion and the upper side portion second seal portion do not affect the are not affected the upper side portion second seal portion and the upper side portion first seal portion, whereby the respective seal portions can provide independent seals, thereby making it possible to ensure the sealing performance.

According to the invention, as has been described heretofore, since the groove portion is formed between the hollow seal portion and the seal lip portion, when the seal lip is brought into abutment with the vehicle-interior side surface of the door glass, the seal lip portion can be deflected easily, whereby even though rain water infiltrates from between the hollow seal portion and the distal end of the door glass, the rain water that has so infiltrated can be discharged to the outside of the vehicle from the groove portion.

Since the water stopping rib is formed in the portion in the groove portion which is the portion on the corner portion which lies in the vicinity of the vertical side portion or the portion on the vertical side portion which lies in the vicinity of the corner portion, when the automobile is washed with water under high pressure, even though washing water infiltrates into the groove portion in the vicinity of the corner portion, the filtration of washing water into the upper side portion can be prevented by the water stopping rib.

DETAILED DESCRIPTION OF THE PREFERRED EMBODIMENTS

An embodiment of the invention will be described based on FIGS. 1 to 4.

Figure 1:
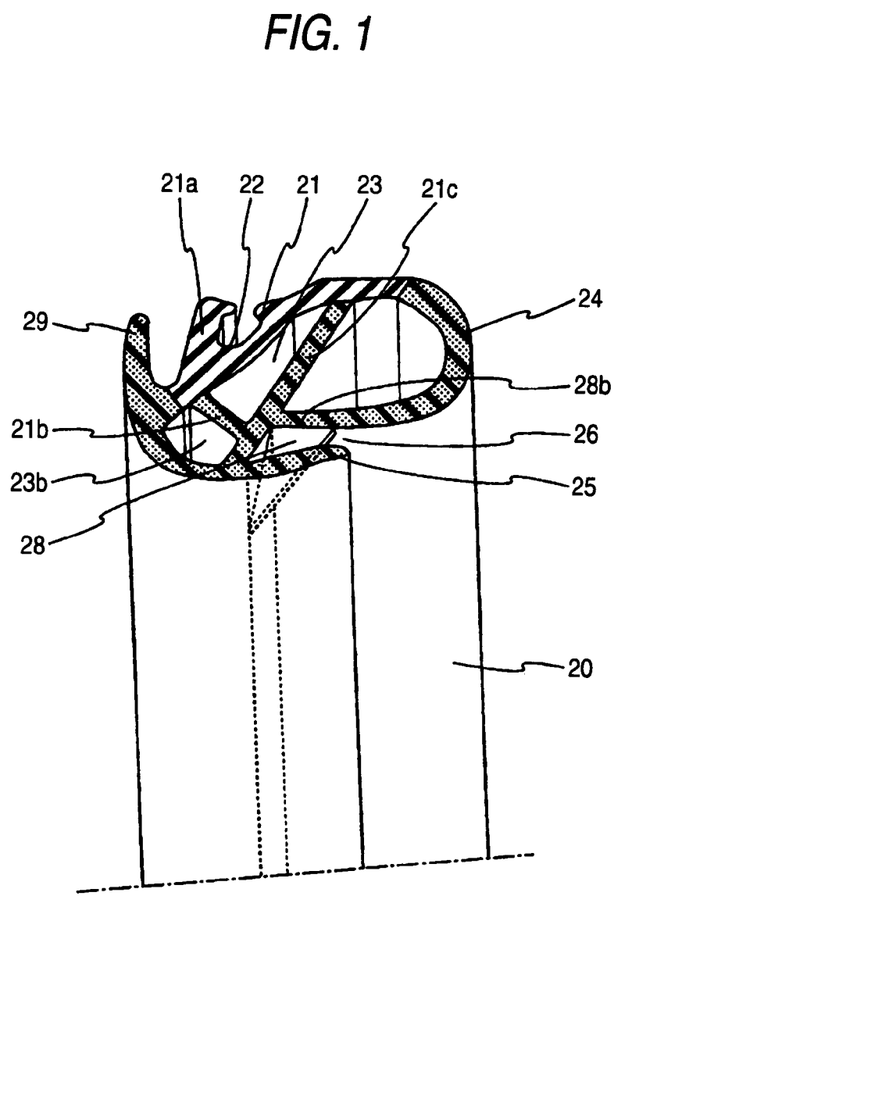
FIG. 1 is a perspective view of a distal end of a vertical side portion of a roof side weather strip according to an embodiment of the invention.
Figure 2:
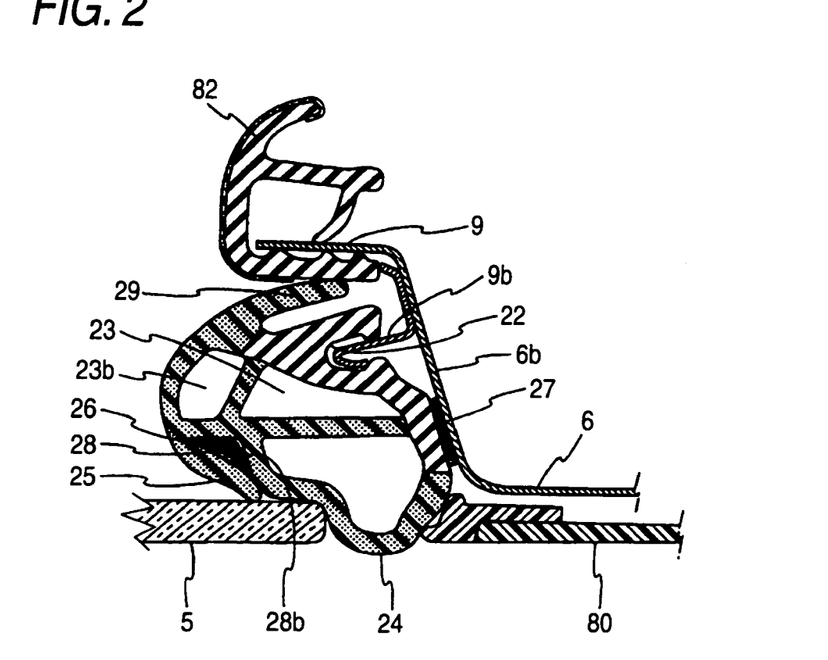
FIG. 2 is a sectional view taken along the line A-A in FIGS. 3 and 4 which shows a state in which a distal end of a door glass in a pillar portion of a peripheral part of a vehicle body opening is brought into abutment with the roof side weather strip.
Figure 3:
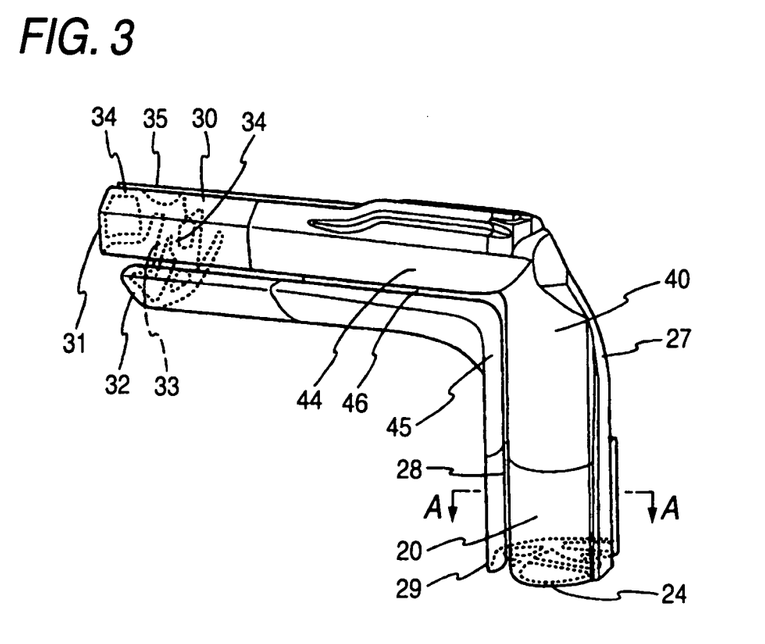
FIG. 3 is a perspective view of a corner portion of the roof side weather strip according to the embodiment of the invention.

FIGS. 1 to 3 show an embodiment of the invention. FIG. 4 is a side view of an automobile. FIG. 1 is a perspective view of a distal end portion of a vertical side portion 20 of a roof side weather strip 10. FIG. 2 is a sectional view taken along the line A-A in FIGS. 3 and 4 which shows a state in which the roof side weather strip 10 is mounted when a door glass 5 is closed, and FIG. 3 is a perspective view of a corner portion 40 of the roof side weather strip 10.

As is shown in FIG. 4, the roof side weather strip 10 of the invention is such as to be used on an automobile which utilizes sashless doors, and door sashes are not provided in upper portions of front and rear side doors 1, which are side doors of the automobile, which lie upper than belt line portions of both the doors, and door glasses 5 are provided over almost the whole of window openings in the respective doors, so that the door glasses 5 can be raised and lowered vertically from and into the doors 1.

The roof side weather strip 10 is made up of an upper side portion 30 which is mounted on a roof side portion of a peripheral part 6 of a vehicle body opening, a vertical side portion 20 which is mounted on a center pillar 6b, and a corner portion 40 which connects together the upper side portion 30 and the vertical portion 20 and is mounted at a corner of the peripheral part 6 of the vehicle body opening. The upper side portion 30 and the vertical side portion 20 are formed through extrusion, and the corner portion 40 is formed through molding. The upper side portion 30 and the vertical portion 20 are vulcanization bonded together at the same time as the corner portion 40 is molded.

Firstly, the configuration of the vertical side portion 20 of the roof side weather strip 10 will be described. As is shown in FIG. 1, the vertical side portion 20 is made up of a mounting base portion 21 which is mounted on the center pillar 6b of the peripheral part 6 of the vehicle body opening, a hollow seal portion 24 which is brought into abutment with a distal end of the door glass 5, and a seal lip portion 25 which is brought into abutment with a vehicle-interior side surface of a distal end portion of the door glass 5.

A mounting recessed portion 22, which is made wide in an interior thereof and made narrow at an entrance thereof, is formed on a vehicle-exterior outer surface of the mounting base portion 21. As is shown in FIG. 2, a distal end of a vertical side portion retainer 9b, which is mounted on the center pillar 6b and which has a substantially L-shaped cross section, is inserted into the mounting recessed portion 22, and a hook-like bend portion at the distal end of the vertical side portion retainer 9b is locked on the narrow entrance portion of the mounting recessed portion 22, thereby making it possible to hold the mounting base portion 21.

A cover lip 29 is formed on a vehicle-interior side end of the mounting base portion 21. The cover lip 29 is brought into abutment with a trim 82 which is mounted at a distal end of the center pillar 6b, so as to cover a gap between the trim 82 and the roof side weather strip 10. The trim 82 is formed into a substantially U-shape in cross section, and a flange 9 at a distal end of the center pillar 6b is inserted to be mounted in an interior of the substantially U-shaped cross section.

A pressure sensitive adhesive double coated tape 27 is attached to a vehicle-exterior outer surface of the mounting base portion 21, and the pressure sensitive adhesive double coated tape 27 is bonded to a vehicle-exterior side end of the center pillar 6b of the peripheral part 6 of the vehicle body opening, whereby the pressure sensitive adhesive double coated tape 27 can attach the mounting base portion 21 to the center pillar 6b together with the vertical side portion 9b that has been described before. The mounting base portion 21 can be mounted using a clip or the like in place of the pressure sensitive adhesive double coated tape 27.

The mounting base portion 21 has two hollow portions in an interior thereof: a vehicle-exterior one constitutes a first mounting hollow portion 23 and a vehicle-interior one a second mounting hollow portion 23b. Since the mounting base portion 21 has the hollow portions, the flexibility of the mounting base portion 21 can be enhanced and a reduction in weight thereof can be realized. A partition wall 21b is formed between the first mounting hollow portion 23 and the second mounting hollow portion 23b, so as to maintain the hollow shape of the mounting base portion 21.

A lower surface 21a of the mounting base portion 21 including the mounting recessed portion 22 is formed of a solid material, and the partition wall 21b and an upper surface 21c of the mounting base portion 21 are formed of a sponge material. Since the mounting base portion 21 is formed of the solid material, the mounting base portion 21 is held on to the center pillar 6b in an ensured fashion. The cover lip 29, the hollow seal portion 24 and the seal lip portion 25 are formed of the sponge material.

The hollow seal portion 24 is formed a vehicle-exterior side of the inner surface and the seal lip portion 25 is formed on a vehicle-interior side of the inner surface of the mounting base portion 21.

The hollow seal portion is formed into a hollow shape on a vehicle-exterior side of the upper surface 21c of the mounting base portion 21. A portion of the hollow seal portion 24 which lies in the vicinity of the lower surface 21a of the mounting base portion 21 may be formed of a solid rubber. In this case, the hollow shape of the hollow seal portion 24 can easily be maintained.

The seal lip portion 25 is formed at a vehicle-interior side end of the upper surface 21c of the mounting base portion 21. Although the seal portion 25 is formed into a plate shape, a hollow portion may be formed in an interior of a lip thereof.

A distal end of a garnish 80 is brought into abutment with a side of the hollow seal portion 24 which faces the peripheral part 6 of the vehicle body opening, so as to cover a gap between the peripheral part 6 of the vehicle body opening and the roof side weather strip 10, thus the aesthetic appearance of the side view of the automobile being enhanced.

A groove portion 26 is formed between the hollow seal portion 24 and the seal lip portion 25. Since this groove portion 26 is present, the seal lip portion 25 can easily be deflected when the seal lip portion 25 is brought into abutment with the vehicle-interior side face of the door glass 5, whereby the seal lip portion 25 can be held in abutment with the vehicle-interior side surface of the door glass 5 even though the door glass 5 is deflected to the outside of the automobile due to vibrations of the automobile or the automobile running at high speeds.

In addition, even though rain water infiltrates from between the hollow seal portion 24 and the distal end of the door glass 5, the rainwater that has so infiltrated is allowed to pass through the groove portion 26, flowing downwards so as to be discharged to the outside of the vehicle.

A water stopping rib 28 is formed in a portion in the groove 26 which constitutes a portion which lies in the vicinity of a portion where the corner portion 40 is connected to the vertical side portion or a portion on the corner portion 40 which lies in the vicinity of the vertical side portion 20 or on the vertical side portion 20 which lies in the vicinity of the corner portion 40. When forming this water stopping rib 28 on the corner portion 40, the water stopping rib 28 is formed at the same time as the corner portion 40 is molded. When the water stopping rib 28 is formed on the portion on the vertical side portion 20 which lies in the vicinity of the corner portion 40, a distal end portion of the vertical side portion 20 is held between molds which molds the corner portion 40, and a cavity for the water stopping rib 28 is formed in the portion where the distal end is so held, whereby the same material as that of which the corner portion 40 is formed is made to flow into the molds from a cavity which forms the corner portion 40 to thereby form the water stopping rib 28.

When the automobile is washed with water under high pressure, although there may be caused a case where washing water displaces the hollow seal portion 24 to infiltrated between the door glass 5 and the hollow seal portion 24, in the vicinity of the corner portion 40, due to the washing water being water under high pressure, the washing water that has so infiltrated does not flow downwards but flows by way of a groove portion 46 in the corner portion 40 to be accumulated, as will be described later, in an upper side portion second seal portion recessed portion 33 that is defined between an upper side portion first seal portion 31 and an upper side portion second seal portion 32 of the upper side portion 30. When the door is opened, the water so accumulated falls into the passenger compartment. By providing the water stopping rib 28, however, when the automobile is washed with water under high pressure, even though washing water infiltrates into the groove portion 26 in the vicinity of the corner portion, the washing water that has so infiltrated is prevented from entering the upper side portion 30 by the water stopping rib 28 and is then allowed to be discharged downwards.

As is shown in FIG. 1, the water stopping rib 28 is preferably formed so as to be inclined relative to a longitudinal direction of the vertical side portion 20. In this case, when the distal end of the door glass 5 is brought into abutment with the seal lip portion 25 while the door is closed, since the water stopping rib 28 is present while being inclined relative to the door glass 5, the water stopping rib 28 becomes easy to be deflected, and the seal lip portion 25 becomes easy to be deflected towards the groove portion 26, thereby making it possible to reduce the force with which the door is closed.

In addition, the water stopping rib 28 is preferably formed into a triangular shape in such a way that the rib becomes wide at a portion lying at a base side of the groove 26 and becomes lower in height as it extends towards an opening of the groove portion 26. In this case, when the seal lip portion 25 is brought into abutment with the distal end of the door glass 5 while the door is closed, the distal end of the seal lip portion 25 is inclined towards the hollow seal portion 24, whereby the cross section of the groove portion 26 takes a triangular shape. Because of this, the seal lip portion 25 and the water stopping rib 28 are brought into close contact with each other, whereby the groove portion 26 is sealed off in an ensured fashion, thereby making it possible to prevent the infiltration of rain water into the upper side portion 30.

The water stopping rib 28 is preferably formed so as to be continuous and integral with the hollow seal portion 24 and to be spaced apart from the seal lip portion 25. In this case, the seal lip portion 25 is spaced apart from the water stopping rib 28 and is made easy to be deflected freely, and the force can be reduced with which the door is closed when the door is closed. In addition, since the water stopping rib 28 is formed integrally with the hollow seal portion 24, the deformation of the water stopping rib 28 which is formed thin can be prevented.

Next, the configuration of the upper side portion 30 will be described.

As is seen from a cross section of the upper side portion 30 shown in FIG. 3, the upper side portion 30 of the roof side weather strip 10 is made up of a mounting base portion 34 and a seal portion, and the mounting base portion 34 is made of a solid material. Since the mounting base portion 34 is made of the solid material, the mounting base portion 34 is mounted strongly and rigidly on the peripheral part 6 of the vehicle body opening or the retainer 4 which is mounted on the peripheral part 6 of the vehicle body opening, thereby making it possible to bring the seal portion, which will be described later, into abutment with the distal end of the door glass 5 in an ensured fashion.

The mounting base portion 34 is bonded to the retainer by a pressure sensitive adhesive double coated tape 35 in a portion which is closer to a vehicle-exterior side. The mounting base portion 34 may be attached with a clip other than the pressure sensitive adhesive double coated tape 35.

The seal portion of the upper side portion 30 is made up of the upper side portion first seal portion 31 which is formed on a vehicle-exterior side and the upper side portion second seal portion 32 which is formed on a vehicle-interior side.

The upper side portion first seal portion 31 is formed of a sponge material into a hollow shape and the upper end of the door glass 5 is brought into abutment with the upper side portion first seal portion 31 when the door glass 5 is raised while the door is closed.

The upper side portion second seal portion 32 is formed of a sponge material into a hollow shape, and a distal end of the upper side portion second seal portion 32 is brought into abutment with an inner surface of the upper end of the door glass 5 when the door is closed. The upper side portion second seal portion 32 is formed into a shape which is bent in a central portion thereof and has the upper side portion second seal portion recessed portion 33. The upper side portion second seal portion 32 can be formed into a lip shape.

When the upper end of the door glass 5 is brought into abutment with the upper side portion 30 while the door is closed, the upper side portion first seal portion 31 is depressed into the interior and encompasses the distal end of the door glass 5. The upper side portion second seal portion 32 is brought into abutment with the vehicle-interior side surface of the door glass 5 which is situated in the vicinity of the upper end thereof and is bent in the portion of the upper side portion second seal portion recessed portion 33 to thereby form a groove.

Then, a gap is produced between the upper side portion first seal portion 31 and the upper side portion second seal portion 32, and rain water that has infiltrated into the passenger compartment from the distal end of the door glass 5 enters the upper side portion second seal portion recessed portion 33. However, there exists inclination on a front side of the upper side portion 30, and normally, the water in the upper side portion second seal portion recessed portion 33 is discharged to the outside of the vehicle by way of the groove therein. However, there may be caused a case where in the upper side portion 30 in the vicinity of the corner portion 40, part of the rain water stays in the upper side portion second seal portion recessed portion 33, however, a further infiltration of the rain water can be prevented by the water stopping rib 28.

The cross sectional shape of the corner portion 40 is formed similar to the cross sectional shape of the vertical side portion 20 in the vicinity of the vertical side portion, and is formed similar to the cross sectional shape of the upper side portion 30 in the vicinity of the upper side portion 30. Then, the cross sectional shape of the corner portion 40 gradually changes in the vicinity of the center thereof, so as to connect together the upper side portion 30 and the vertical side portion 20 smoothly. The corner portion 40 also has a hollow seal portion 44, a seal lip portion 45 and the groove portion 46, and the groove portion 46 connects the upper side portion second seal portion recessed portion 33 with the groove portion 26 of the vertical side portion 20.

In the roof side weather strip 10, a synthetic rubber, a thermoplastic elastomer and a soft synthetic resin are used for both the solid material and the sponge material, and as the synthetic rubber, the thermoplastic elastomer and the soft synthetic resin, for example, an EPDM rubber, an olefin-based elastomer and a soft vinyl chloride are used, respectively.

In the case of the synthetic rubber, an extruded synthetic rubber is transferred to a vulcanization tank to be heated by hot air or high-frequency waves for vulcanization. In the case of the thermoplastic elastomer and the soft synthetic resin, an extruded component is cooled to be set. Thereafter, the extruded and vulcanized or set components is cut to predetermined lengths, and the production of extruded components is completed.

What is claimed is:

1. A roof side weather strip for a hard-top type automobile mounted on a peripheral part of a vehicle body opening in a vehicle body of the automobile, to provide a seal between the peripheral part of the vehicle body opening and a door, said weather strip comprising:
    an upper side portion mounted along a roof of the vehicle body of the automobile;
    a vertical side portion mounted along a pillar of the vehicle body of the automobile; and
    a corner portion mounted in a corner of the peripheral part to connect the upper side portion and the vertical side portion together while changing cross sectional shapes as the corner portion extends from the upper side portion to the vertical side portion,
    wherein the vertical side portion has a mounting base portion which is to be mounted on the pillar, a hollow seal portion formed on an exterior of the vehicle body inner surface of the mounting base portion so as to be brought into abutment with a door glass, and a seal lip portion formed on an interior of the vehicle body inner surface of the mounting base portion adjacent to an inside of the hollow seal portion so as to be brought into abutment with a vehicle-interior surface of the door glass,
    wherein a groove portion is formed between the hollow seal portion and the seal lip portion,
    wherein a water stopping rib is formed in a portion in the groove portion which is a portion of the corner portion lying adjacent to the vertical side portion or a portion of the vertical side portion lying adjacent to the corner portion,
    wherein the water stopping rib is inclined relative to a longitudinal direction of the vertical side portion,
    wherein a width of the water stopping rib decreases from a bottom side of the groove portion as the water stopping rib extends towards an opening of the groove portion,
    wherein the water stopping rib is formed so as to be integral with the hollow seal portion and to be spaced apart from the seal lip portion to define a space therebetween,
    wherein the water stopping rib comprises a sponge material, and
    wherein the water stopping rib has a triangular shape.

2. A roof side weather strip for an automobile as set forth in claim 1, wherein the mounting base portion of the vertical side portion is mounted on the pillar with a pressure sensitive adhesive double coated tape.

3. A roof side weather strip for an automobile as set forth in claim 1, wherein the upper side portion of the roof side weather strip has an upper side portion mounting base portion which is to be mounted on the peripheral part of the vehicle body opening and an upper side portion seal portion which is formed integrally with the upper side portion mounting base portion to provide a seal between the peripheral part of the vehicle body opening and the door, the upper side portion mounting base portion comprising at least a bottom wall and a vehicle-interior side wall, and
    wherein an upper side portion first seal portion which is brought into abutment with a distal end of the door glass to provide a seal thereat and an upper portion second seal portion which is brought into abutment with a vehicle-interior side face of a distal end portion of the door glass to provide a seal thereat are provided separately on an inner surface of the upper side portion mounting base portion.

4. A roof side weather strip for an automobile as set forth in claim 1, wherein the width of the water stopping rib continuously decreases from the bottom side of the groove portion as the water stopping rib extends towards the opening of the groove portion.

5. A roof side weather strip for an automobile as set forth in claim 1, wherein the water stopping rib defines a space between the hollow seal portion and the seal lip portion.

6. A roof side weather strip for an automobile as set forth in claim 1, wherein, when the seal lip portion abuts a distal end of the door glass, a distal end of the seal lip portion is inclined towards the hollow seal portion.

* * * * *